US009865170B2

(12) United States Patent
Loce et al.

(10) Patent No.: US 9,865,170 B2
(45) Date of Patent: Jan. 9, 2018

(54) SYSTEM AND METHOD TO INCREASE CONSPICUOUSNESS OF VEHICLES

(71) Applicant: Conduent Business Services, LLC, Dallas, TX (US)

(72) Inventors: Robert P Loce, Webster, NY (US); Raja Bala, Webster, NY (US); Michael R Furst, Rochester, NY (US)

(73) Assignee: Conduent Business Services, LLC, Dallas, TX (US)

( * ) Notice: Subject to any disclaimer, the term of this patent is extended or adjusted under 35 U.S.C. 154(b) by 542 days.

(21) Appl. No.: 14/451,978

(22) Filed: Aug. 5, 2014

(65) Prior Publication Data

US 2015/0048934 A1 Feb. 19, 2015

Related U.S. Application Data

(60) Provisional application No. 61/865,797, filed on Aug. 14, 2013.

(51) Int. Cl.
*B60Q 1/00* (2006.01)
*G08G 1/16* (2006.01)

(52) U.S. Cl.
CPC .................................... *G08G 1/166* (2013.01)

(58) Field of Classification Search
CPC .................................... B60Q 1/00; G02B 1/00
See application file for complete search history.

(56) References Cited

U.S. PATENT DOCUMENTS 4,875,142 A 10/1989 Spector
2012/0025964 A1* 2/2012 Beggs .................. B60Q 1/2673 340/435
2012/0095646 A1* 4/2012 Ghazarian ............... G01S 19/17 701/36
2012/0212484 A1* 8/2012 Haddick ............ G02B 27/0093 345/419

OTHER PUBLICATIONS

Request for Proposal: NineSigma REQUEST 369555, "Creative Solutions to Increase Daytime Awareness of Small Vehicles", RFP format and graphics—Copyright 2013 NineSigma, Inc., NineSights.com, 2pp.
Dash Lights/Deck Lights/Visor Lights from swps.com, http://www.swps.com/dashlights.html?gclid=COeAr7KWxrgCFQya4AodLAMAfa, 2014, 3 pp.
"Surround-View Camera Vision System Design", Surround-View Camera Vision System Design http://www.altera.com/end-markets/auto/driver/assist/aut-surround-cam.html, Altera Corporation, 2014, 1 page.

(Continued)

*Primary Examiner* — Shirley Lu
(74) *Attorney, Agent, or Firm* — Fay Sharpe LLP

(57) ABSTRACT

Systems and methods are provided for real time dynamic triggering of a conspicuous signal for a vehicle on a path of travel. A sensor array detects environmental factors presenting a predetermined risk to the vehicle. A decision module assesses the environmental factors and the associated risks and determines if the conspicuousness signal is warranted and a type of signal to be made. An actuating module actuates the conspicuousness signal based on the determining of the decision module.

17 Claims, 3 Drawing Sheets

(56) References Cited

OTHER PUBLICATIONS

Waiters, K.; Minwalla, C.; Liscombe, M.; Lio, H.I.; Thomas, P.; Hornsey, R.; Ellis, K.; Jennings, S.: "Characterization of an Optical Collision Avoidance Sensor", 978-1-4244-1643-1/08/$25 2011 IEEE, 5 pp.
EPIC—Electronic Privacy Information Center: "License Plate Recognition Systems", http://epic.org/privacy/licenseplates/, Electronic Privacy Information Center, 1718 Connecticut Av NW, Washington DC May 16, 2014, 5 pp.
Ragith: "How Does a Proximity Sensor Work?", http://wiki.answers.com/Q/How-does-a-proximity-sensor-work, May 16, 2014, 2 pp.
Extreme Tactical Dynamics: "Can Civilians Install Strobe Lights on Vehicles?", http://www.extremetacticaldynamcis.com/can-civilians-install-strobe-lights-on-vehicles.php, 2007-2014, 3 pp.
McNerthney, C.: Seattle 911—A Police and Crime Blog: "What Color Lights are Allowed on the Rear of Vehicles?", http://blog.seattleepi.com/seattle911/20009/04/28/what-color-lights-are-allowed-on-the-rear-of-vehicles, Seattle PI, Posted Apr. 28, 2009—6 pp.
Lopez, C.: "Government Requires Quiet Hybrids to Add More 'Vroom'"; http://abcnews.go.com/blogs/headlines/2013/01/government-requires-quiet-hybrids-to-add-more-vroom/.
Mahadevan, V., Vasconcelos, N.: "Spatiotemporal Saliency in Dynamic Scenes", IEEE Transactions on Pattern Analysis and Machine Intelligence, Vo. 32, No. 1, Jan. 2010, pp. 171-177, 7 pp.

* cited by examiner

SYSTEM AND METHOD TO INCREASE CONSPICUOUSNESS OF VEHICLES

This application claims the priority benefit of U.S. application Ser. No. 61/865,797, filed Aug. 14, 2013, the disclosure of which is incorporated herein by reference.

TECHNICAL FIELD

The presently disclosed embodiments are directed to control systems to enhance noticeability and visibility of a vehicle depending upon the dynamic and adaptive detection of the environment of the vehicle. The detection is particularly based on environmental factors that could present a danger to a vehicle so that a conspicuous action can be actuated in response to the detection, which action may typically use signaling methods and devices such as modulated lighting and sound.

BACKGROUND

Selectively actuatable methods and devices such as sound and lighting are well known to enhance the conspicuousness of a vehicle for purposes of making vehicle operation safer to a driver or vehicles or operators near the vehicle. Flashing lights, modulated beepers, horns, etc. are typical examples of such systems. Almost all such systems are operator controlled and exclusively and only actuated by the operator. Proximity sensors (typically at the rear of a vehicle) and ambient lighting sensors to control vehicle lights are examples of automatic systems out of exclusive operator control.

Environmental concerns and rising fuel cost have increased interest in small cars, motorcycles and bicycles. However, many commuters have resisted the switch to fuel efficient transportation due to safety concerns about small vehicles. The primary problem arises from a lack of awareness/visual recognition of smaller vehicles by drivers of larger cars and trucks. While current lighting solutions are effective at improving recognition of small vehicles at night, these lighting schemes exhibit poor results during daytime driving.

There is thus a need for a system that can increase the conspicuousness of a vehicle based on particular sensed environmental factors that can present a danger to the vehicle, thereby making the vehicle safer to operate for the vehicle operator and nearby other vehicles, their operators, and pedestrians or others.

SUMMARY

According to aspects illustrated herein, there are disclosed aspects and features of embodiments of systems and methods that increase the conspicuousness of smaller or otherwise inconspicuous vehicles based on particular environmental factors that can present a danger to the vehicle, thereby making the vehicle safer to operate on roadways that are shared with other vehicles. Disclosed aspects and features of the present embodiments include dynamically actuating a modulated signal embedded or attached to the vehicle so as to maximize conspicuousness by taking into account particular environmental factors, such as neighboring vehicles, geographical positioning, such as at an intersection, or traffic merge point, and detected ambient light or sound. The environmental awareness differs from known, less aware systems, such as continuous flashing lights (e.g., bicycles lights), and other vehicles.

The present system is comprised of at least three key elements:

(1) A sensing means that acquires information on a vehicle environment, such as proximity to nearby vehicles, intersections, and merge points. The sensing may be from devices such as cameras, infrared (IF) sensors, radar, sound or a GPS navigation system.

(2) A decision making mechanism that uses the sensed information to decide if a conspicuousness action is warranted and the possible type of action.

(3) A conspicuousness action that is actuated in response to the decision, which uses methods and devices such as modulated lighting and sound.

DETAILED DESCRIPTION

The embodiments include at least three main elements: (1) a sensor array 10 that acquires information on an object on a path of travel such as a vehicle by acquiring information on the vehicle's environment; (2) a decision making module 20 that uses the sensor information to decide if a conspicuousness action or signal is warranted and the possible type of action; and, (3) an actuation module 30 that is actuated in response to the decision to enable the conspicuousness action, which action is intended to enable especially noticeable methods and devices such as modulated lighting and sound to thereby enhance the awareness of the actuated vehicle.

By vehicle is meant any kind of transportation device, motorized or non-motorized, such as a bicycle or automobile.

Figure 1:
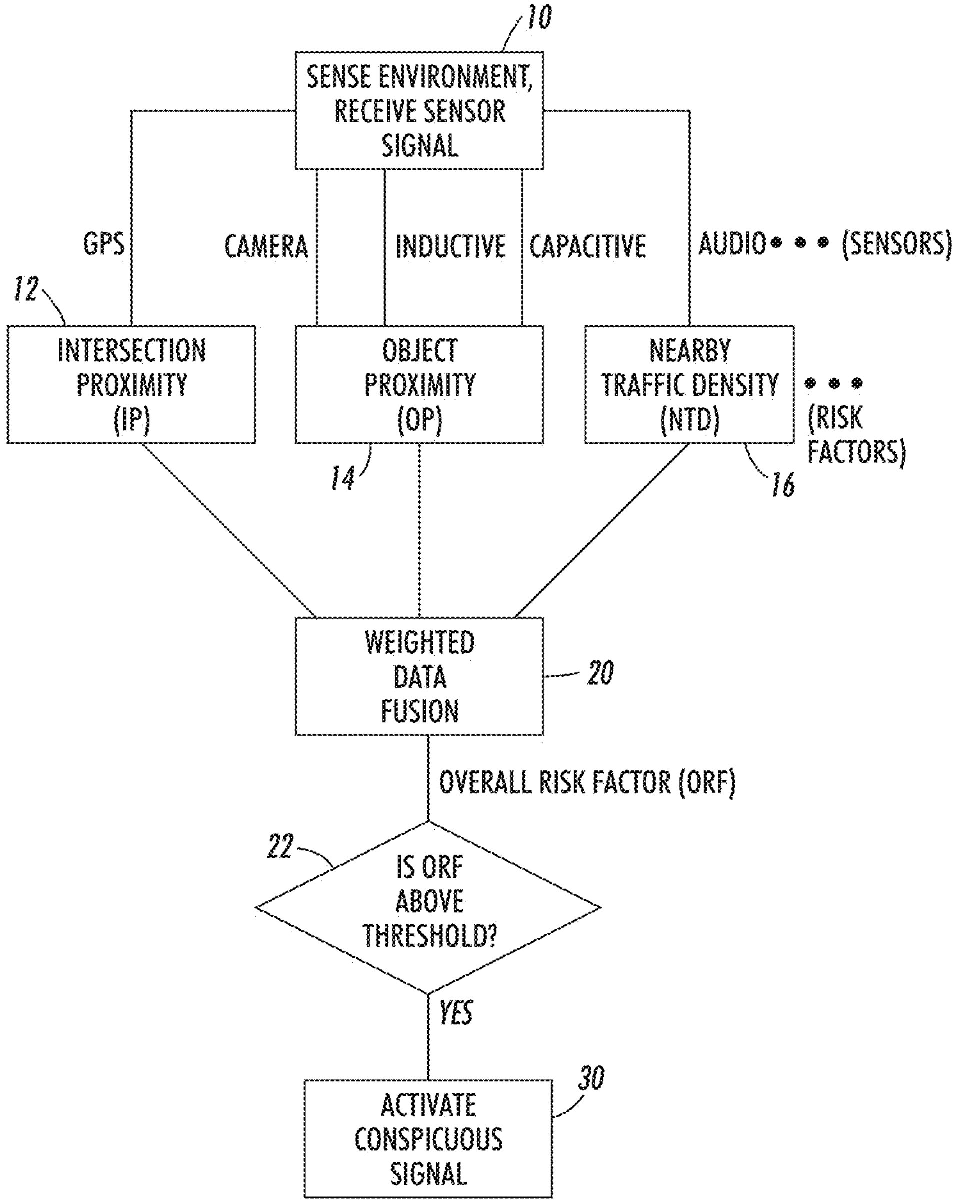
FIG. 1 is flowchart/block diagram of an exemplary embodiment of the subject system and method.
Figure 2:
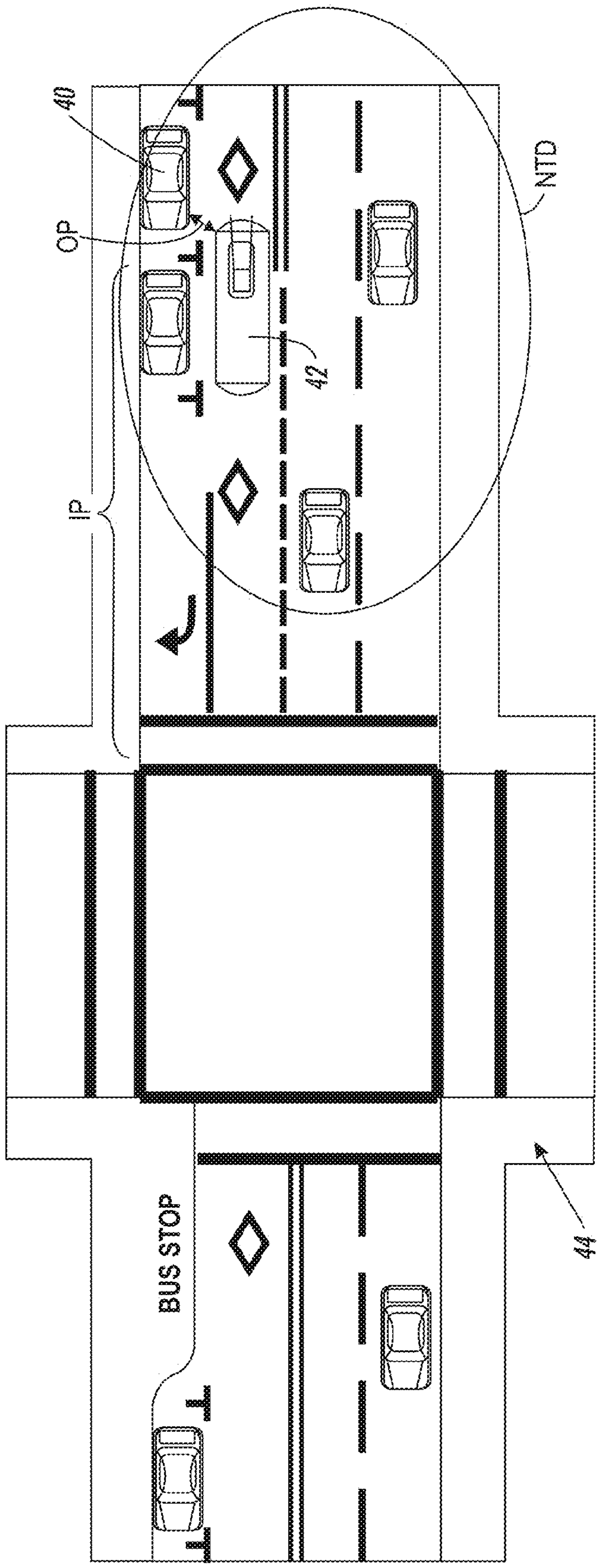
FIG. 2 is a planar view of a plurality of vehicles moving along a road.

The present system and methods will make an inconspicuous vehicle more conspicuous based on the identification of environmental factors that could represent a high risk situation for the inconspicuous vehicle, especially if it is smaller than nearby vehicles and/or is in a high traffic density area. The enabling of the conspicuousness action is not employed at all times because people tend to be less aware of signals that are always present. For example, running lights on a vehicle tend to make the vehicle more conspicuous, thereby reducing the number of accidents, but stronger solutions are needed. To avoid the "constant-on" syndrome plus the associated energy usage, the subject system must sense environmental factors of concern. Several options may be employed within the present system. Exemplary sensors in the sensor array 10 are illustrated as GPS, camera, inductive, capacitive, audio. The sensing array may also use a broadcast signal, or a stored electronic map, whereby the GPS navigation and electronic mapping devices can indicate critical or risky road locations for a smaller vehicle. Examples of such locations include busy intersections and traffic circles, highway merge points, or areas with high accident historical statistics. FIG. 1 shows an intersection proximity module 12 receiving a GPS navigation signal from the sensor array 10. With reference to FIG. 2, a smaller vehicle 40 is seen to be to be traveling along the road with a plurality of other vehicles nearby including a much larger vehicle 42. Intersection 44 is being approached so that there is an intersection proximity (IP) signal being provided to the vehicle 40 that may trigger the conspicuousness action as the vehicle gets within a certain distance thereof.

An object proximity module receives signals from the sensor array 10 of the proximity of nearby objects. An object proximity module 14 receives the signals from the sensor array 10 representative of objects around the smaller vehicle. Camera-based systems are typically employed for the sensing of these factors—360° camera viewing systems are now commercially available. Vehicle detection from vehicle-mounted cameras are also known, e.g., license plate readers on police cars, or camera-based vehicle collision avoidance systems. There are four basic types of proximity switches that can be used as vehicle environmental sensors: infrared, acoustic, capacitive and inductive.

Infrared proximity switches work by sending out beams of invisible infrared light. A photo detector on the proximity switch detects any reflections of this light. These reflections allow infrared proximity switches to determine whether there is an object nearby. As proximity switches with just a light source and photodiode are susceptible to false readings due to background light, more complex switches modulate the transmitted light at a specific frequency and have receivers which only respond to that frequency. Even more complex proximity sensors are able to use the light reflected from an object to compute its distance from the sensor.

Acoustic proximity sensors are similar in principle to infrared models, but use sound instead of light. They use a transducer to transmit inaudible sound waves at various frequencies in a preset sequence, and then measure the length of time the sound takes to hit a nearby object and return to a second transducer on the switch. Essentially, acoustic proximity sensors measure the time it takes for sound pulses to "echo" and use this measurement to calculate distance, just like sonar.

Capacitive proximity switches sense distance to objects by detecting changes in capacitance around it. A radio-frequency oscillator is connected to a metal plate. When the plate nears an object, the radio frequency changes, and the frequency detector sends a signal telling the switch to open or close. These proximity switches have the disadvantage of being more sensitive to objects that conduct electricity than to objects that do not.

Inductive proximity switches sense distance to objects by generating magnetic fields. They are similar in principle to metal detectors. A coil of wire is charged with electrical current, and an electronic circuit measures this current. If a metallic part gets close enough to the coil, the current will increase and the proximity switch will open or close accordingly. The chief disadvantage of inductive proximity switches is that they can only detect metallic objects.

Photo and acoustic sensors may be employed that measure the ambient light or sound—both natural and artificial. These can be used to dynamically determine an appropriate light/sound actuation pattern that will maximize vehicle conspicuousness with respect to the current environment. Ambient light detection, with or without combination with time of day, can also be an important sensed environmental condition.

With particular reference to FIG. 2, it can be seen that the smaller vehicle 40 can determine the proximity of the larger vehicle 42 with the above-mentioned sensors. Nearby traffic density (NTD) module 16 principally relies on audio sensor signals for assessing risk due to traffic density. In FIG. 2, it can be seen that the density is fairly high, as there are three other cars and one bus within the NTD area.

All of the proximity and density modules 12, 14, 16 compare the signals incoming from the sensor array 10 with preselected thresholds for determining a predetermined risk to the smaller vehicle presented by the sensor-detected environmental factors. The risk factors are associated with a weighting schedule based upon the seriousness of the sensed environmental factor relative to danger for the smaller vehicle 40. The weighted risk factors are compiled in a weighted data fusion processor 20 for purposes of computing an overall risk factor which is compared 22 to a preselected threshold. When the overall risk factor exceeds the threshold, the actuating model 30 can then enable an appropriate conspicuousness signal. With particular reference to FIG. 2 again, it can be seen that a smaller vehicle 40 is in close proximity to the larger vehicle 42 and also within a relatively dense area of nearby traffic, being surrounded by three other cars and the large vehicle 42, and is approaching an intersection 44. The weighted data fusion processor 22 would evaluate all of these environmental factors to the vehicle 40 and compute an overall risk factor that exceeds the actuating threshold so that the conspicuous signal will be enabled for the vehicle 40. One factor for establishing distances of concern for intersections and other vehicles is based on headlamp distances that are considered reasonably safe for observing road conditions. High beam headlights can reveal objects up to a distance of at least 450 feet and are most effective for speeds faster than 25 MPH.

The more information that can be sensed by sensors or position identifiers the better the decision making module can perform. Also, if the acquired information is independent of operator control, it can be accepted as more trustworthy. As the sensed information is real time, continuous and dynamically changing, the subject embodiments include operating controls that are corresponding dynamically adaptive for real time actuating of the conspicuousness signaling.

The decision making mechanism module 20 that uses the sensed information to decide if a conspicuousness action is warranted and possibly the type of action may comprise a variety of controllers, in software or hardware.

The decision to actuate the conspicuousness signaling is based on the type of sensor and the targeted risky scenario—intersection, merge lane, traffic circle, nearby vehicle, etc. The sensor data will give an estimate of the distance or detect the presence of a given targeted scenario. If the distance is below a threshold or the presence signal is suitably strong, a decision is made to actuate the conspicuousness signal. For example, if it is decided that this vehicle is approaching an intersection, then the conspicuousness signaling is turned on. When determined that the vehicle is fifty yards beyond the intersection, and moving away from it, then the conspicuousness action can be turned off. Similarly, when other sensors indicate a reduction in risk, a second threshold value, the signal can be disabled.

A conspicuousness action module 30 is actuated in response to the decision, which uses methods and devices such as modulated lighting and sound. Human sensory processes are very keen at detecting change, and less sensitive at detecting constant phenomenon. Hence a blinking light is more noticeable than a static light, and a modulated sound is more noticeable than a constant sound. While constant running lights on vehicles are having some positive benefit during daylight, given the difference in perceptibility, blinking lights are expected to have a more significant effect. Also, the blinking lights in the subject system are activated by the proximity sensor so they are not always on. This change from "off" to "on" is another change that will aid in perceiving a small vehicle as it is approached. Properties of light that can be modulated to increase conspicuousness include one or more of brightness, color, and spatio-temporal on/off patterns.

Figure 3:
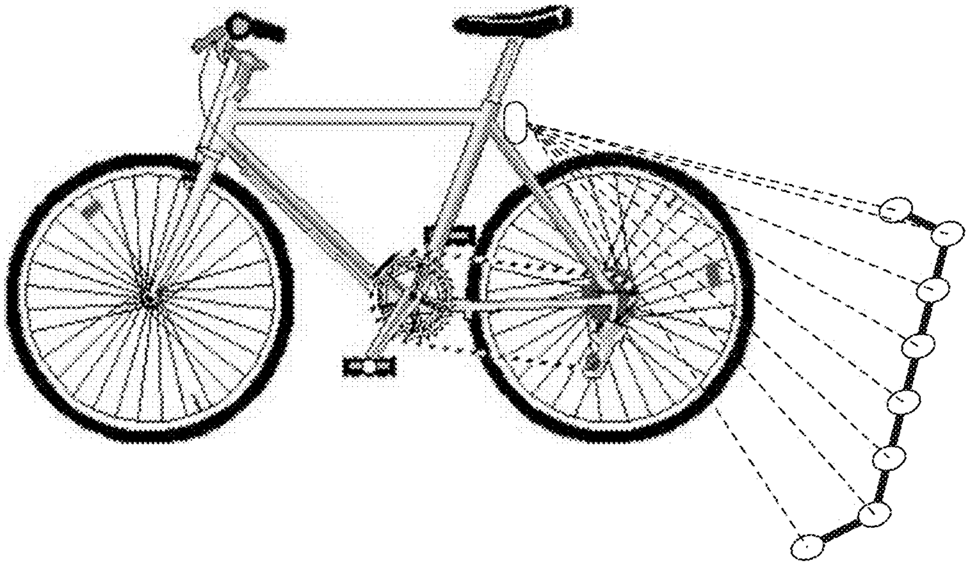
FIG. 3 is vehicle with a conspicuousness of signal of projected laser flares.

Current technology seems to favor LED light systems for vehicles due to their durability and low energy usage, but other light sources may be used, such as incandescent, gas flashlamps, and fluorescent tubes. FIG. 3 shows a projection signal of laser flares for a bicycle. A desirable brightness could be around that of an automobile headlamp (700 lumens), so it is not disturbing to other drivers. It is also a good practice to have the lights shine down on the road similar to an automobile headlamp, versus shining at other drivers.

Lights on a vehicle are regulated by jurisdiction, and would need to conform to legislation. In general, civilians are allowed to have strobe lights that conform to certain color and brightness limitations. Here is an example of a portion of the law for the rear of vehicles in Washington state:

> "All lighting devices and reflectors mounted on the rear of any vehicle shall display or reflect a red color, except the stop lamp or other signal device, which may be red, amber, or yellow, and except that on any vehicle forty or more years old, or on any motorcycle regardless of age, the taillight may also contain a blue or purple insert of not more than one inch in diameter, and except that the light illuminating the license plate shall be white and the light emitted by a back-up lamp shall be white or amber."

When an audible signal is used for conspicuousness, it could operate as a fixed sound level or the system could include a microphone so the signal could be adjusted to be above the ambient noise. It would be best to have the signal be above 70 decibels, which is above average street noise. Modulated sound can also be used, as long as it does not simulate a siren. A variant of the present invention can be used to warn smaller entities (pedestrians, bicycles) of the presence of a quiet electric vehicle. There are current proposals in the US, for electric cars to produce sound when traveling at speeds less than 18 mph, because electric cars traveling that slow are considered too quiet to be noticeable by pedestrians. An alternative is to activate the sound below 18 mph and when a pedestrian or bicycle is detected. This alternative to the current proposal would lower the noise levels in our cities.

Models for human audio/visual saliency and attention can be leveraged to provide the optimal actuation to maximize human attention based on received sensor input and limited by physical and legislative constraints. Simpler heuristics may also be used to optimize signal saliency. For example, high (e.g., roofline) or wide areas (handlebars, vehicle sides, . . . ) on a vehicle or patterns that span wide areas may be preferred.

Also, appropriate notifications from the sensor, decision-making, and actuation modules could be relayed to the driver as a notification of the environmental condition so they may raise their awareness and possibly alter their driving behavior. In concept, it would have similar motivations as cameras used to make blind spots visible. Such notification could be provided via some form of visualization from the vehicle dashboard.

As can be appreciated by the foregoing, the subject system triggers a conspicuous action emanating from and directed outwardly from the vehicle so that other operators of nearby vehicles, or other sensing systems in those vehicles, can be better aware of the vehicle 40. The sensory is based on real time sensed ambient conditions, and not by operator control. Certainly an operator driving a vehicle into proximity with neighboring vehicles has some operator control, but what is more important for the system to assess is whether the proximity distance is short enough that it would be better and safer for a conspicuousness signaling action to occur that would better identify a vehicle to the neighboring vehicles, or in a more dangerous location, thereby providing enhanced safety to the operator of the vehicle. Accordingly, the real time dynamic adaptability of the signaling system to continually varying conditions, exclusive of operator control to trigger the signaling, presents a system which provides better safety to a vehicle operator, especially in a vehicle that is smaller vehicle relative to neighboring vehicles.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for real time, dynamic triggering of a conspicuousness signal for a vehicle on a path of public street travel having potentially dangerous other moving vehicles thereon comprising:

a first sensor array including a GPS navigation signal, that detects an environmental factor presenting a predetermined risk to the vehicle including a proximity of a one of the other moving vehicles based upon sensor operation on the vehicle without reception of an identifying signal from the other moving vehicles, derived from the GPS navigation signal and based upon sensor operation on the vehicle without reception of an identifying signal from the other moving vehicles;

a second sensor comprising a location device for identifying a location of the public street travel;

a decision module that assesses the environmental factor, the location and the predetermined risk and determining if the conspicuousness signal is warranted and a type of signal to be made; and, an actuation module that actuates the conspicuousness signal based on the determining of the decision module at another location in the path of travel for enhanced identification of the first object by the second object.

2. The system of claim 1 wherein the sensor comprises multiple sensors exclusive of vehicle operator control including a proximity sensor comprising a video, a radar, an IR, and an inductive device to detect presence of a nearby one of a vehicle, pedestrian or object; a geo-location sensor and a video sensor to detect proximity to a busy traffic location; and, a photo sensor to detect ambient light; an acoustic sensor to detect ambient sound; and a clock and calendar device for time and day of week.

3. The system of claim 2 wherein the decision module includes a processor for generating variations in weighting inputs from the multiple sensors, for real time adjusting decision thresholds for actuating alerts, and for determining the type and characteristics of the conspicuousness signal.

4. The system of claim 1 wherein the actuation module includes light comprising selected spatio-temporal patterns, LEDs, incandescent and fluorescent, and sound comprising different frequencies and patterns.

5. The system of claim 1 wherein the decision module further determines that the conspicuousness signal should be deactivated upon an assessment that the risk is no longer present.

6. The system of claim 1 wherein the sensor comprises an intersection proximity sensor, an object proximity sensor and a nearby traffic density sensor.

7. The system of claim 6 wherein the sensor communicates the predetermined risk to a weighted data fusion processor.

8. The system of claim 7 wherein the weighted data fusion processor computes an overall risk factor comprising a plurality of predetermined risk factors generated from multiple sensors.

9. The system of claim 8 wherein the decision module compares the overall risk factor to a predetermined threshold.

10. A method of generating a conspicuousness signal associated with an object on a path of travel comprising:

(a) monitoring with a sensor array including a GPS navigation signal, a first object on a path of public street travel in relation to at least one of a second object including a potentially dangerous other moving vehicle and a location of the public street travel derived from the GPS navigation signal and based upon sensor operation on the vehicle without reception of an identifying signal from the other moving vehicles the monitoring corresponding to an indicia signal from the sensor based on a relative distance between the first object and the at least one of a second object and the location;

(b) actuating the conspicuousness signal for enhanced identification of the first object by the second object associated with the first object when the indicia signal reaches a first threshold at another location in the path of travel, thereby causing an increase in at least one of acoustic and light energy emanating in a direction away from the first object; and (c) adjusting the conspicuousness signal associated with the first object when the indicia signal reaches a second threshold, thereby changing the level of the at least one of acoustic and light energy emanating from the first object.

11. The method of claim 10 wherein the monitoring includes sensing object proximity with at least one of a video, radar, infrared or inductive device.

12. The method of claim 10 wherein the monitoring further includes sensing proximity of the first object to an intersection.

13. The method of claim 10 wherein the monitoring further includes sensing nearby traffic density to the first object.

14. The method of claim 10 wherein the actuating includes assessing a risk associated with the indicia relative to the first threshold.

15. The method of claim 14 wherein the assessing includes sensing a plurality of risk factors comprising intersection proximity, object proximity and nearby traffic density and communicating the plurality of risk factors to a weighted data fusion processor.

16. The method of claim 15 wherein the assessing includes determining an overall risk factor relative to the first threshold.

17. The method of claim 16 wherein the adjusting includes disabling the conspicuousness signal.

* * * * *